US008817106B2

(12) United States Patent
Richardson et al.

(10) Patent No.: US 8,817,106 B2
(45) Date of Patent: Aug. 26, 2014

(54) INFRARED CAMERA WITH IMAGE PROCESSING MODES FOR MARITIME APPLICATIONS

(75) Inventors: Patrick B. Richardson, Santa Barbara, CA (US); Jeffrey D. Frank, Santa Barbara, CA (US); Austin A. Richards, Santa Barbara, CA (US); Nicholas Högasten, Santa Barbara, CA (US); James T. Woolaway, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 1032 days.

(21) Appl. No.: 11/946,798

(22) Filed: Nov. 28, 2007

(65) Prior Publication Data
US 2013/0208125 A1    Aug. 15, 2013

(51) Int. Cl.
*H04N 5/33* (2006.01)
(52) U.S. Cl.
USPC ........................ 348/164; 348/E5.09; 250/330
(58) Field of Classification Search
USPC ................ 348/151–155, 164, E5.024, E5.09; 250/330, 332
See application file for complete search history.

(56) References Cited

U.S. PATENT DOCUMENTS

| 6,849,849 | B1 | 2/2005 | Warner et al. | |
|---|---|---|---|---|
| 7,340,162 | B2 * | 3/2008 | Terre et al. | 250/330 |
| 7,924,312 | B2 * | 4/2011 | Packard | 348/164 |
| 8,242,445 | B1 * | 8/2012 | Scanlon et al. | 250/330 |
| 2005/0035858 | A1 * | 2/2005 | Liu | 348/152 |
| 2006/0188246 | A1 * | 8/2006 | Terre et al. | 396/275 |
| 2007/0064108 | A1 * | 3/2007 | Haler | 348/164 |
| 2007/0138347 | A1 * | 6/2007 | Ehlers | 246/1 R |
| 2008/0099678 | A1 * | 5/2008 | Johnson et al. | 250/332 |
| 2010/0111489 | A1 * | 5/2010 | Presler | 348/E05.024 |

* cited by examiner

*Primary Examiner* — Bharat N Barot
(74) *Attorney, Agent, or Firm* — Haynes and Boone, LLP (57) ABSTRACT

Systems and methods disclosed herein provide an image capture component adapted to capture an infrared image, a control component adapted to provide a plurality of selectable processing modes to a user, receive a user input corresponding to a user selected processing mode, generate a control signal indicative of the user selected processing mode and transmit the generated control signal. The user selected processing modes, for example, may be directed to maritime applications, such as night docking, man overboard, night cruising, day cruising, hazy conditions, and/or shoreline modes. The systems and methods further provide a processing component adapted to receive the generated control signal from the control component, process the captured infrared image according to the user selected processing mode, and generate a processed infrared image, and a display component adapted to display the processed infrared image.

26 Claims, 7 Drawing Sheets

INFRARED CAMERA WITH IMAGE PROCESSING MODES FOR MARITIME APPLICATIONS

TECHNICAL FIELD

The present disclosure relates to infrared imaging systems and, in particular, to infrared camera modes for maritime applications.

BACKGROUND

Infrared cameras are utilized in a variety of imaging applications to capture infrared images and some image processing techniques allow for suppression of unwanted features, such as noise, and/or refinement of captured infrared images. For example, infrared cameras may be utilized for maritime applications to enhance visibility under various conditions for a naval crew. However, there generally are a number of drawbacks for conventional maritime implementation approaches for infrared cameras.

One drawback of conventional infrared cameras is that a user is generally not allowed to switch between different processing techniques during viewing of the infrared image or the optimal settings may be difficult to determine by the user. Another drawback is that user-controlled processing may occur post capture, after initial processing has been performed, which generally lessens the user's input and control and may result in a less than desirable image being displayed.

As a result, there is a need for improved techniques for providing selectable viewing controls for infrared cameras. There is also a need for improved infrared camera processing techniques for maritime applications.

SUMMARY

Systems and methods disclosed herein provide user selectable processing techniques and modes of operation for infrared cameras in accordance with one or more embodiments. Systems and methods disclosed herein also provide improved processing techniques of infrared images for maritime applications in accordance with one or more embodiments.

In accordance with an embodiment of the present disclosure, a system comprises an image capture component adapted to capture an infrared image and a control component adapted to provide a plurality of selectable processing modes to a user, receive a user input corresponding to a user selected processing mode, and transmit a control signal indicative of the user selected processing mode. The system further comprises a processing component adapted to receive the control signal from the control component, process the captured infrared image according to the user selected processing mode, and generate a processed infrared image. The system further comprises a display component adapted to display the processed infrared image.

In one implementation, the selectable processing modes may include a night docking mode that causes the processing component to histogram equalize and scale the captured infrared image to generate the processed infrared image. In another implementation, the selectable processing modes may include a man overboard mode that causes the processing component to apply a high pass filter to the captured infrared image to generate the processed infrared image. In another implementation, the selectable processing modes may include a night cruising mode that causes the processing component to extract a detailed part and a background part from the captured infrared image, separately scale the detailed part, separately histogram equalize and scale the background part, and add the detailed part to the background part to generate the processed infrared image. In another implementation, the selectable processing modes may include a day cruising mode that causes the processing component to extract a detailed part and a background part from the captured infrared image, separately scale the detailed part, separately histogram equalize and scale the background part, and add the detailed part to the background part to generate the processed infrared image. In another implementation, the selectable processing modes may include a hazy conditions mode that causes the processing component to apply a non-linear low pass filter on the captured infrared image, and then histogram equalize and scale the filtered image to generate the processed infrared image. In yet another implementation, the selectable processing modes may include a shoreline identification (e.g., a horizon or landline identification) that may be provided to the display component. In still another implementation, the system may further include a night display mode, wherein the display component is adapted to display the processed infrared image in a red color palette or a green color palette.

In accordance with another embodiment of the present disclosure, a method includes capturing an infrared image, providing a plurality of selectable processing modes to a user, receiving a user input corresponding to a user selected processing mode, and processing the captured infrared image according to the user selected processing mode. The method further includes generating a processed infrared image and displaying the processed infrared image.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
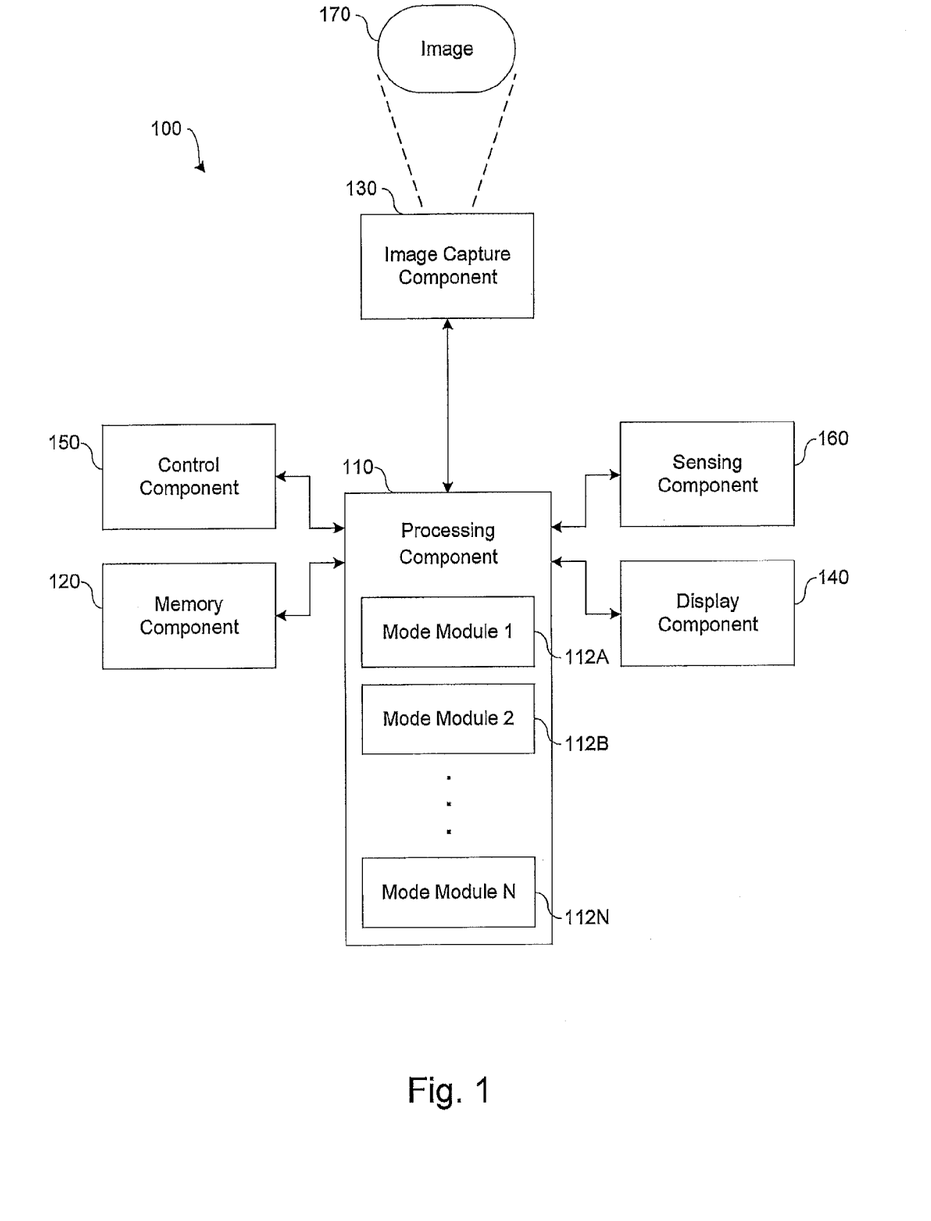
FIG. 1 shows a block diagram illustrating an infrared imaging system for capturing and processing infrared images in accordance with an embodiment of the present disclosure.

In accordance with an embodiment of the present disclosure, FIG. 1 shows a block diagram illustrating an infrared imaging system 100 for capturing and processing infrared images. Infrared imaging system 100 comprises a processing component 110, a memory component 120, an image capture component 130, a display component 140, a control component 150, and optionally a sensing component 160.

In various implementations, infrared imaging system 100 may represent an infrared imaging device, such as an infrared camera, to capture images, such as image 170. Infrared imaging system 100 may represent any type of infrared camera, which for example detects infrared radiation and provides representative data (e.g., one or more snapshots or video infrared images). For example, infrared imaging system 100 may represent an infrared camera that is directed to the near, middle, and/or far infrared spectrums. Infrared imaging system 100 may comprise a portable device and may be incorporated, for example, into a vehicle (e.g., a naval vehicle, a land-based vehicle, an aircraft, or a spacecraft) or a non-mobile installation requiring infrared images to be stored and/or displayed.

Processing component 110 comprises, in one embodiment, a microprocessor, a single-core processor, a multi-core processor, a microcontroller, a logic device (e.g., a programmable logic device configured to perform processing functions), a digital signal processing (DSP) device, or some other type of generally known processor. Processing component 110 is adapted to interface and communicate with components 120, 130, 140, 150 and 160 to perform method and processing steps as described herein. Processing component 110 may comprise one or more mode modules 112A-112N for operating in one or more modes of operation, which is described in greater detail herein. In one implementation, mode modules 112A-112N define preset display functions that may be embedded in processing component 110 or stored on memory component 120 for access and execution by processing component 110. Moreover, processing component 110 may be adapted to perform various other types of image processing algorithms in a manner as described herein.

In various implementations, it should be appreciated that each of mode modules 112A-112N may be integrated in software and/or hardware as part of processing component 110, or code (e.g., software or configuration data) for each of the modes of operation associated with each mode module 112A-112N, which may be stored in memory component 120. Embodiments of mode modules 112A-112N (i.e., modes of operation) disclosed herein may be stored by a separate computer-readable medium (e.g., a memory, such as a hard drive, a compact disk, a digital video disk, or a flash memory) to be executed by a computer (e.g., a logic or processor-based system) to perform various methods disclosed herein. In one example, the computer-readable medium may be portable and/or located separate from infrared imaging system 100, with stored mode modules 112A-112N provided to infrared imaging system 100 by coupling the computer-readable medium to infrared imaging system 100 and/or by infrared imaging system 100 downloading (e.g., via a wired or wireless link) the mode modules 112A-112N from the computer-readable medium. As described in greater detail herein, mode modules 112A-112N provide for improved infrared camera processing techniques for real time applications, wherein a user or operator may change the mode while viewing an image on display component 140.

Memory component 120 comprises, in one embodiment, one or more memory devices to store data and information. The one or more memory devices may comprise various types of memory including volatile and non-volatile memory devices, such as RAM (Random Access Memory), ROM (Read-Only Memory), EEPROM (Electrically-Erasable Read-Only Memory), flash memory, etc. Processing component 110 is adapted to execute software stored in memory component 120 to perform methods, processes, and modes of operations in manner as described herein.

Image capture component 130 comprises, in one embodiment, one or more infrared sensors (e.g., any type of infrared detector, such as a focal plane array) for capturing infrared image signals representative of an image, such as image 170. In one implementation, the infrared sensors of image capture component 130 provide for representing (e.g., converting) a captured image signal of image 170 as digital data (e.g., via an analog-to-digital converter included as part of the infrared sensor or separate from the infrared sensor as part of infrared imaging system 100). Processing component 110 may be adapted to receive the infrared image signals from image capture component 130, process the infrared image signals (e.g., to provide processed image data), store the infrared image signals or image data in memory component 120, and/or retrieve stored infrared image signals from memory component 120. Processing component 110 may be adapted to process infrared image signals stored in memory component 120 to provide image data (e.g., captured and/or processed infrared image data) to display component 140 for viewing by a user.

Display component 140 comprises, in one embodiment, an image display device (e.g., a liquid crystal display (LCD)) or various other types of generally known video displays or monitors. Processing component 110 may be adapted to display image data and information on display component 140. Processing component 110 may also be adapted to retrieve image data and information from memory component 120 and display any retrieved image data and information on display component 140. Display component 140 may comprise display electronics, which may be utilized by processing component 110 to display image data and information (e.g., infrared images). Display component 140 may receive image data and information directly from image capture component 130 via processing component 110, or the image data and information may be transferred from memory component 120 via processing component 110. In one implementation, processing component 110 may initially process a captured image and present a processed image in one mode, corresponding to mode modules 112A-112N, and then upon user input to control component 150, processing component 110 may switch the current mode to a different mode for viewing the processed image on display component 140 in the different mode. This switching may be referred to as applying the infrared camera processing techniques of mode modules 112A-112N for real time applications, wherein a user or operator may change the mode while viewing an image on display component 140 based on user input to control component 150.

Control component 150 comprises, in one embodiment, a user input and/or interface device having one or more user actuated components, such as one or more push buttons, slide bars, rotatable knobs or a keyboard, that are adapted to generate one or more user actuated input control signals. Control component 150 may be adapted to be integrated as part of display component 140 to function as both a user input device and a display device, such as, for example, a touch screen device adapted to receive input signals from a user touching different parts of the display screen. Processing component 110 may be adapted to sense control input signals from control component 150 and respond to any sensed control input signals received therefrom. Processing component 110 may be adapted to interpret the control input signal as a value, which will be described in greater detail herein.

Figure 4:
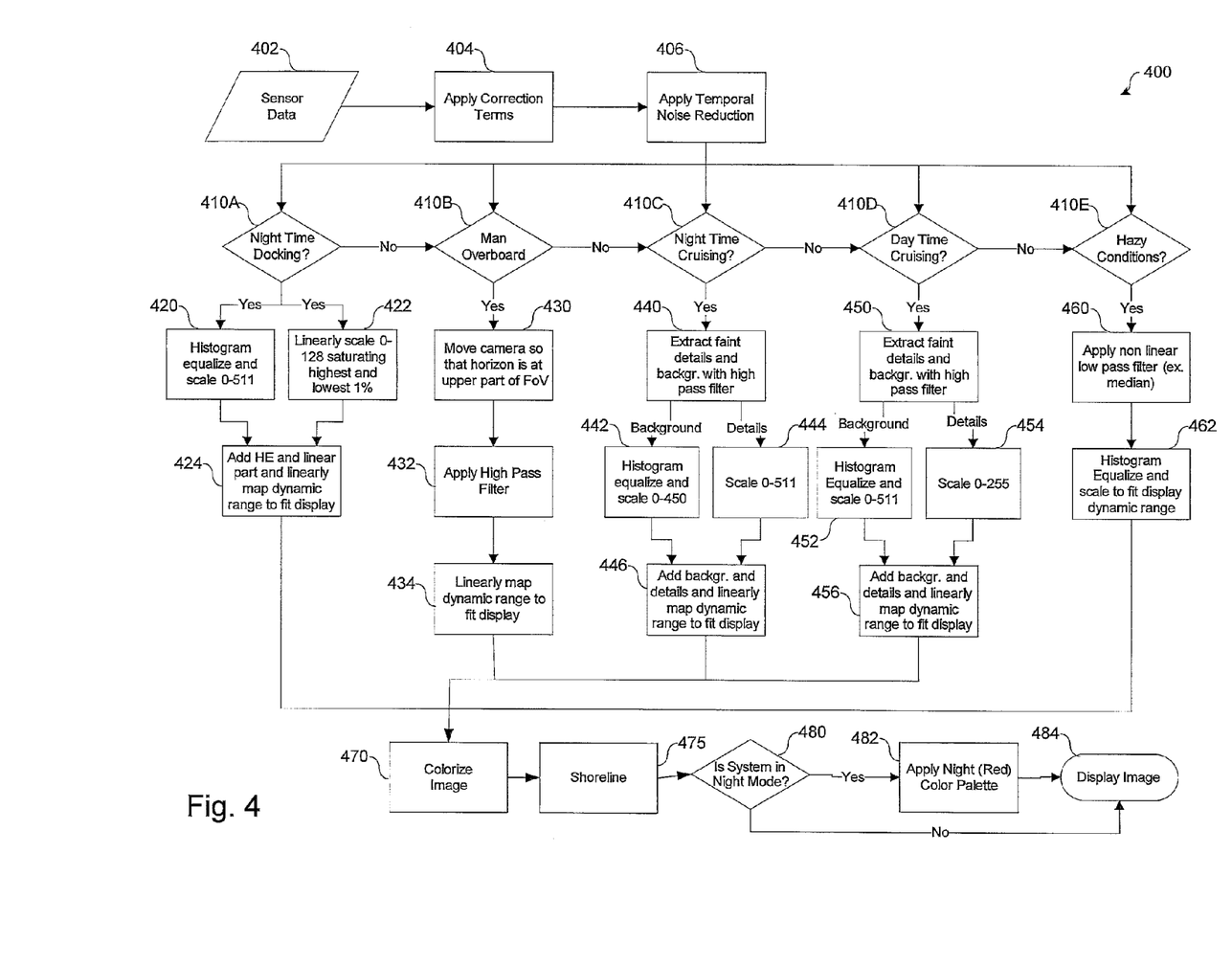
FIG. 4 shows a block diagram illustrating an overview of infrared processing techniques in accordance with various embodiments of the present disclosure.
Figure 5:
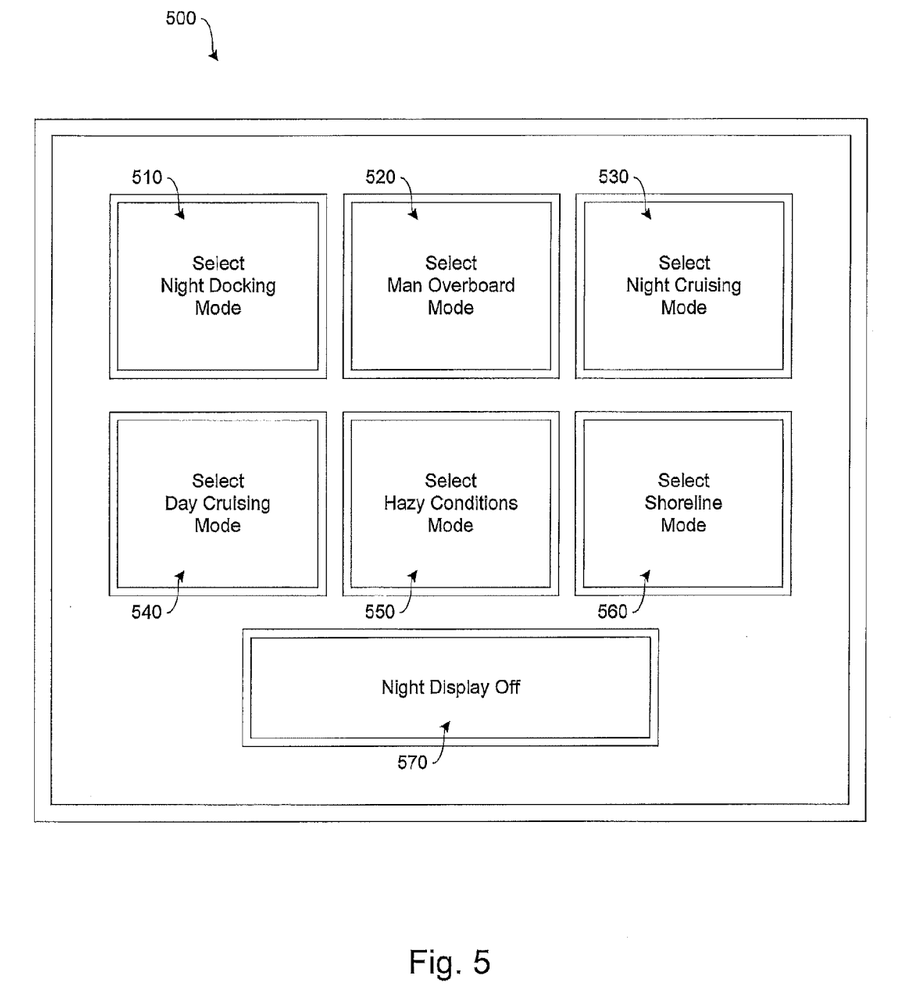
FIG. 5 shows a block diagram illustrating a control component of the infrared imaging system for selecting between different modes of operation in accordance with an embodiment of the present disclosure.

Control component 150 may comprise, in one embodiment, a control panel unit 500 (e.g., a wired or wireless handheld control unit) having one or more push buttons adapted to interface with a user and receive user input control values, as shown in FIG. 5 and further described herein. In various implementations, one or more push buttons of control panel unit 500 may be utilized to select between the various modes of operation as described herein in reference to FIGS. 2-4. For example, only one push button may be implemented and which is used by the operator to cycle through the various modes of operation (e.g., night docking, man overboard, night cruising, day cruising, hazy conditions, and shoreline), with the selected mode indicated on the display component 140. In various other implementations, it should be appreciated that control panel unit 500 may be adapted to include one or more other push buttons to provide various other control functions of infrared imaging system 100, such as auto-focus, menu enable and selection, field of view (FoV), brightness, contrast, gain, offset, spatial, temporal, and/or various other features and/or parameters. In another implementation, a variable gain value may be adjusted by the user or operator based on a selected mode of operation.

In another embodiment, control component 150 may comprise a graphical user interface (GUI), which may be integrated as part of display component 140 (e.g., a user actuated touch screen), having one or more images of, for example, push buttons adapted to interface with a user and receive user input control values.

Optional sensing component 160 comprises, in one embodiment, one or more various types of sensors, including environmental sensors, depending upon the desired application or implementation requirements, which provide information to processing component 110. Processing component 110 may be adapted to communicate with sensing component 160 (e.g., by receiving sensor information from sensing component 160) and with image capture component 130 (e.g., by receiving data from image capture component 130 and providing and/or receiving command, control or other information to and/or from other components of infrared imaging system 100).

In various implementations, optional sensing component 160 may provide data and information relating to environmental conditions, such as outside temperature, lighting conditions (e.g., day, night, dusk, and/or dawn), humidity level, specific weather conditions (e.g., sun, rain, and/or snow), distance (e.g., laser rangefinder), and/or whether a tunnel, a covered dock, or that some type of enclosure has been entered or exited. Optional sensing component 160 may represent conventional sensors as would be known by one skilled in the art for monitoring various conditions (e.g., environmental conditions) that may have an affect (e.g., on the image appearance) on the data provided by image capture component 130.

In some embodiments, optional sensing component 160 (e.g., one or more of sensors 106) may comprise devices that relay information to processing component 110 via wireless communication. For example, sensing component 160 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In various embodiments, components of image capturing system 100 may be combined and/or implemented or not, as desired or depending upon the application or requirements, with image capturing system 100 representing various functional blocks of a system. For example, processing component 110 may be combined with memory component 120, image capture component 130, display component 140 and/or sensing component 160. In another example, processing component 110 may be combined with image capture component 130 with only certain functions of processing component 110 performed by circuitry (e.g., a processor, a microprocessor, a microcontroller, a logic device, etc.) within image capture component 130. In still another example, control component 150 may be combined with one or more other components or be remotely connected to at least one other component, such as processing component 110, via a control wire to as to provide control signals thereto.

Figure 2:
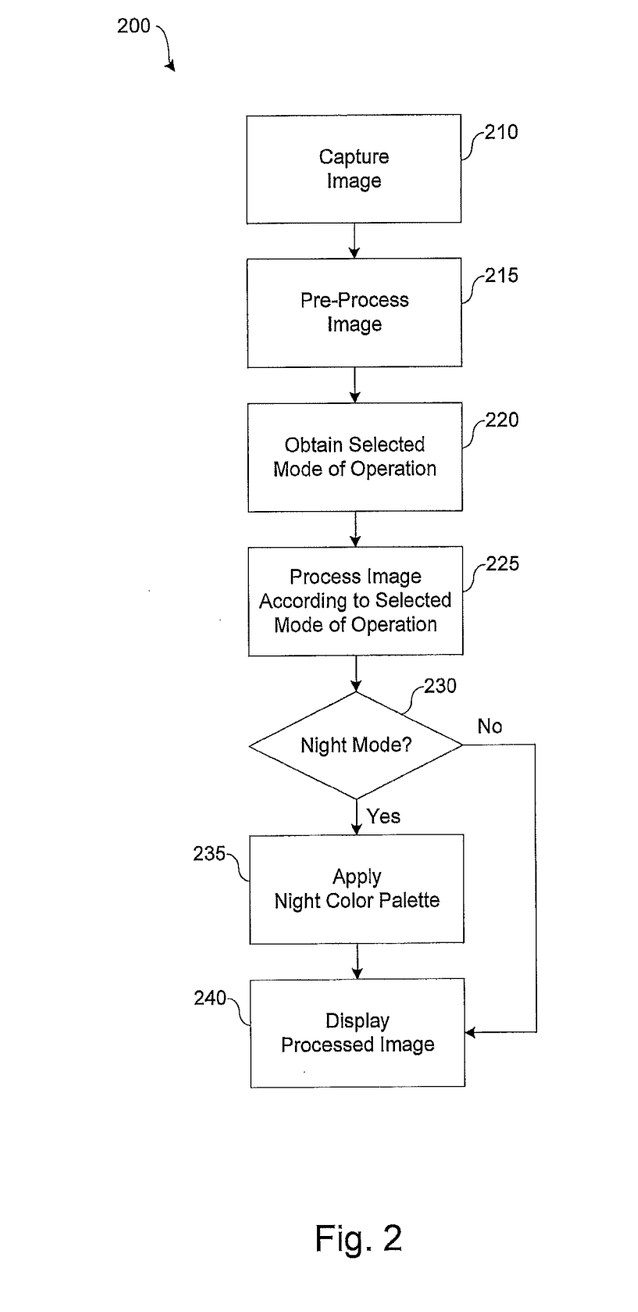
FIG. 2 shows a block diagram illustrating a method for capturing and processing infrared images in accordance with an embodiment of the present disclosure.

FIG. 2 shows a method 200 for capturing and processing infrared images in accordance with an embodiment of the present disclosure. For purposes of simplifying discussion of FIG. 2, reference may be made to image capturing system 100 of FIG. 1 as an example of a system, device or apparatus that may perform method 200.

Referring to FIG. 2, an image (e.g., infrared image signal) is captured (block 210) with infrared imaging system 100. In one implementation, processing component 110 induces (e.g., causes) image capture component 130 to capture an image, such as, for example, image 170. After receiving the captured image from image capture component 130, processing component 110 may optionally store the captured image in memory component 120 for processing.

Next, the captured image may optionally be pre-processed (block 215). In one implementation, pre-processing may include obtaining infrared sensor data related to the captured image, applying correction terms, and/or applying temporal noise reduction to improve image quality prior to further processing. In another implementation, processing component 110 may directly pre-process the captured image or optionally retrieve the captured image stored in memory component 120 and then pre-process the image. Pre-processed images may be optionally stored in memory component 120 for further processing.

Next, a selected mode of operation may be obtained (block 220). In one implementation, the selected mode of operation may comprise a user input control signal that may be obtained or received from control component 150 (e.g., control panel unit 500 of FIG. 5). In various implementations, the selected mode of operation may be selected from at least one of night docking, man overboard, night cruising, day cruising, hazy conditions, and shoreline mode. As such, processing component 110 may communicate with control component 150 to obtain the selected mode of operation as input by a user. These modes of operation are described in greater detail herein and may include the use of one or more infrared image processing algorithms.

In various implementations, modes of operation refer to preset processing and display functions for an infrared image, and infrared imagers and infrared cameras are adapted to process infrared sensor data prior to displaying the data to a user. In general, display algorithms attempt to present the scene (i.e., field of view) information in an effective way to the user. In some cases, infrared image processing algorithms are utilized to present a good image under a variety of conditions, and the infrared image processing algorithms provide the user with one or more options to tune parameters and run the camera in "manual mode". In one aspect, infrared imaging system 100 may be simplified by hiding advanced manual settings. In another aspect, the concept of preset image processing for different conditions may be implemented in maritime applications.

Next, referring to FIG. 2, the image is processed in accordance with the selected mode of operation (block 225), in a manner as described in greater detail herein. In one implementation, processing component 110 may store the processed image in memory component 120 for displaying. In another implementation, processing component 110 may retrieve the processed image stored in memory component 120 and display the processed image on display component 150 for viewing by a user.

Next, a determination is made as to whether to display the processed image in a night mode (block 230), in a manner as described in greater detail herein. If yes, then processing component 110 configures display component 140 to apply a night color palette to the processed image (block 235), and the processed image is displayed in night mode (block 240). For example, in night mode (e.g., for night docking, night cruising, or other modes when operating at night), an image may be displayed in a red palette or green palette to improve night vision capacity for a user. Otherwise, if night mode is not necessary, then the processed image is displayed in a non-night mode manner (e.g., black hot or white hot palette) (block 240).

In various implementations, the night mode of displaying images refers to using a red color palette or green color palette to assist the user or operator in the dark when adjusting to low light conditions. During night operation of image capturing system 100, human visual capacity to see in the dark may be impaired by the blinding effect of a bright image on a display monitor. Hence, the night mode setting changes the color palette from a standard black hot or white hot palette to a red or green color palette display. In one aspect, the red or green color palette is generally known to interfere less with human night vision capacity. In one example, for a red-green-blue (RGB) type of display, the green and blue pixels may be disabled to boost the red color for a red color palette. In another implementation, the night mode display may be combined with any other mode of operation of infrared imaging system 100, as described herein, and a default display mode of infrared imaging system 100 at night may be the night mode display.

Furthermore in various implementations, certain image features may be appropriately marked (e.g., color-indicated or colorized, highlighted, or identified with other indicia), such as during the image processing (block 225) or displaying of the processed image (block 240), to aid a user to identify these features while viewing the displayed image. For example, as discussed further herein, during a man overboard mode, a suspected person (e.g., or other warm-bodied animal or object) may be indicated in the displayed image with a blue color (or other color or type of marking) relative to the black and white palette or night color palette (e.g., red palette). As another example, as discussed further herein, during a night time or daytime cruising mode and/or hazy conditions mode, potential hazards in the water may be indicated in the displayed image with a yellow color (or other color or type of marking) to aid a user viewing the display. Further details regarding image colorization may be found, for example, in U.S. Pat. No. 6,849,849, which is incorporated herein by reference in its entirety.

In various implementations, processing component 110 may switch the processing mode of a captured image in real time and change the displayed processed image from one mode, corresponding to mode modules 112A-112N, to a different mode upon receiving user input from control component 150. As such, processing component 110 may switch a current mode of display to a different mode of display for viewing the processed image by the user or operator on display component 140. This switching may be referred to as applying the infrared camera processing techniques of mode modules 112A-112N for real time applications, wherein a user or operator may change the displayed mode while viewing an image on display component 140 based on user input to control component 150.

FIGS. 3A-3E show block diagrams illustrating infrared processing techniques in accordance with various embodiments of the present disclosure. As described herein, infrared imaging system 100 is adapted to switch between different modes of operation so as to improve the infrared images and information provided to a user or operator.

Figure 3A:
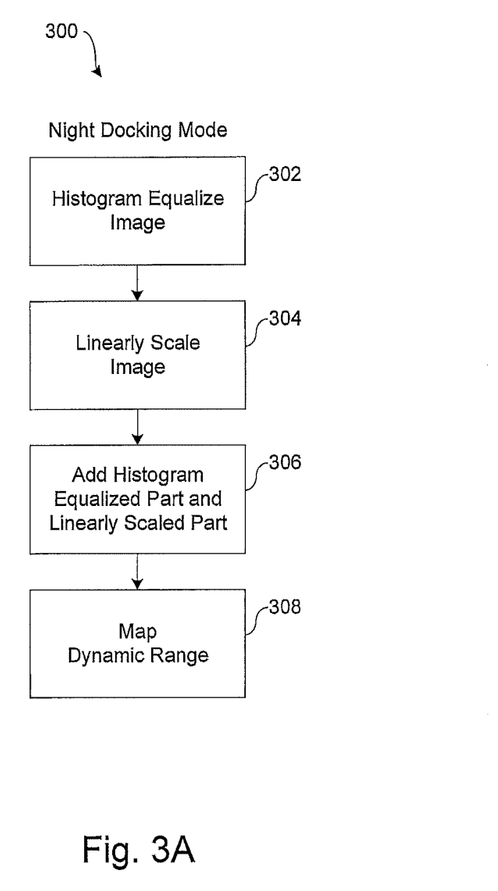
FIGS. 3A-3F show block diagrams illustrating infrared processing techniques in accordance with various embodiments of the present disclosure.

FIG. 3A shows one embodiment of an infrared processing technique 300 as described in reference to block 225 of FIG. 2. In one implementation, the infrared processing technique 300 comprises a night docking mode of operation for maritime applications. For example, during night docking, a watercraft or sea vessel is in the vicinity of a harbor, jetty or marina, which have proximate structures including piers, buoys, other watercraft, other structures on land. A thermal infrared imager (e.g., infrared imaging system 100) may be used as a navigational tool in finding a correct docking spot. The infrared imaging system 100 produces an infrared image that assists the user or operator in docking the watercraft. There is a high likelihood of hotspots in the image, such as dock lights, vents and running motors, which may have a minimal impact on how the scene is displayed.

Referring to FIG. 3A, the input image is histogram equalized and scaled (e.g., 0-511) to form a histogram equalized part (block 302). Next, the input image is linearly scaled (e.g., 0-128) while saturating the highest and lowest (e.g., 1%) to form a linearly scaled part (block 304). Next, the histogram-equalized part and the linearly scaled part are added together to form an output image (block 306). Next, the dynamic range of the output image is linearly mapped to fit the display component 140 (block 308). It should be appreciated that the block order in which the process 300 is executed may be executed in an different order without departing from the scope of the present disclosure.

In one embodiment, the night docking mode is intended for image settings with large amounts of thermal clutter, such as a harbor, a port, or an anchorage. The settings may allow the user to view the scene without blooming on hot objects. Hence, infrared processing technique 300 for the night docking mode is useful for situational awareness in maritime applications when, for example, docking a watercraft with low visibility.

In various implementations, during processing of an image when the night docking mode is selected, the image is histogram equalized to compress the dynamic range by removing "holes" in the histogram. The histogram may be plateau limited so that large uniform areas, such as sky or water components, are not given too much contrast. For example, approximately 20% of the dynamic range of the output image may be preserved for a straight linear mapping of the non-histogram equalized image. In the linear mapping, for example, the lowest 1% of the pixel values are mapped to zero and the highest 1% of the input pixels are mapped to a maximum value of the display range (e.g., 235). In one aspect, the final output image becomes a weighted sum of the histogram equalized and linearly (with 1% "outlier" cropping) mapped images.

Figure 3B:
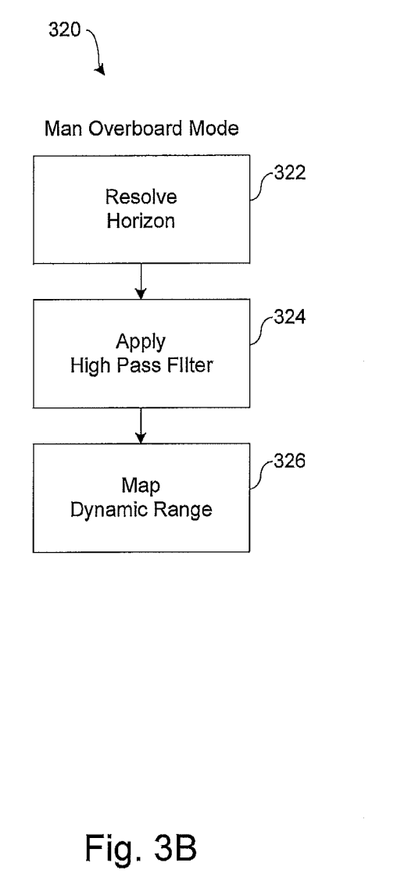

FIG. 3B shows one embodiment of an infrared processing technique 320 as described in reference to block 225 of FIG. 2. In one implementation, the infrared processing technique 320 comprises a man overboard mode of operation for maritime applications. For example, in the man overboard mode, image capturing system 100 may be tuned to the specific task of finding a person in the water. The distance between the person in the water and the watercraft may not be known, and the person may be only a few pixels in diameter or significantly larger if lying close to the watercraft. In one aspect, even t a person may be close to the watercraft, the person may have enough thermal signature to be clearly visible, and thus the man overboard display mode may target the case where the person has weak thermal contrast and is far enough away so as to not be clearly visible without the aid of image capturing system 100.

Referring to FIG. 3B, image capture component 130 (e.g., infrared camera) of image capturing system 100 is positioned to resolve or identify the horizon (block 322). In one implementation, the infrared camera is moved so that the horizon is at an upper part of the field of view (FoV). In another implementation, the shoreline may also be indicated along with the horizon. Next, a high pass filter (HPF) is applied to the image to form an output image (block 324). Next, the dynamic range of the output image is linearly mapped to fit the display component 140 (block 326). It should be appreciated that the block order in which the process 320 is executed may be executed in an different order without departing from the scope of the present disclosure.

In one example, horizon identification may include shoreline identification, and the horizon and/or shoreline may be indicated by a line (e.g., a red line or other indicia) superimposed on a thermal image along the horizon and/or the shoreline, which may be useful for user or operators to determine position of the watercraft in relation to the shoreline. Horizon and/or shoreline identification may be accomplished by utilizing a real-time Hough transform or other equivalent type of transform applied to the image stream, wherein this image processing transform finds linear regions (e.g., lines) in an image. The real-time Hough transform may also be used to find the horizon and/or shoreline in open ocean when, for example, the contrast may be low. Under clear conditions, the horizon and/or shoreline may be easy identified. However, on a hazy day, the horizon and/or shoreline may be difficult to locate.

In general, knowing where the horizon and/or shoreline are is useful for situational awareness. As such, in various implementations, the Hough transform may be allied to any of the modes of operation described herein to identify the horizon and/or shoreline in an image. For example, the shoreline identification (e.g., horizon and/or shoreline) may be included along with any of the processing modes to provide a line (e.g., any type of marker, such as a red line or other indicia) on the displayed image and/or the information may be used to position the infrared camera's field of view.

In one embodiment of the man overboard mode, signal gain may be increased to bring out minute temperature differences of the ocean, such as encountered when looking for a hypothermic body in a uniform ocean temperature that may be close to the person's body temperature. Image quality is traded for the ability to detect small temperature changes when comparing a human body to ocean temperature. Thus, infrared processing technique 320 for the man overboard mode is useful for situational awareness in maritime applications when, for example, searching for a man overboard proximate to the watercraft.

In various implementations, during processing of an image when the man overboard mode is selected, a high pass filter is applied to the image. For example, the signal from the convolution of the image by a Gaussian kernel may be subtracted. The remaining high pass information is linearly stretched to fit the display range, which may increase the contrast of any small object in the water. In one enhancement of the man overboard mode, objects in the water may be marked, and the system signals the watercraft to direct a searchlight at the object. For systems with both visible and thermal imagers, the thermal imager is displayed. For zoom or multi-FoV systems, the system is set in a wide FoV. For pan-tilt controlled systems with stored elevation settings for the horizon, the system is moved so that the horizon is visible just below the upper limit of the field of view.

In one embodiment, the man overboard mode may activate a locate procedure to identify an area of interest, zoom-in on the area of interest, and position a searchlight on the area of interest. For example, the man overboard mode may activate a locate procedure to identify a position of a object (e.g., a person) in the water, zoom-in the infrared imaging device (e.g., an infrared camera) on the identified object in the water, and then point a searchlight on the identified object in the water. In various implementations, these actions may be added to process 200 of FIG. 2 and/or process 320 of FIG. 3B and further be adapted to occur automatically so that the area of interest and/or location of the object of interest may be quickly identified and retrieved by a crew member.

Figure 3C:
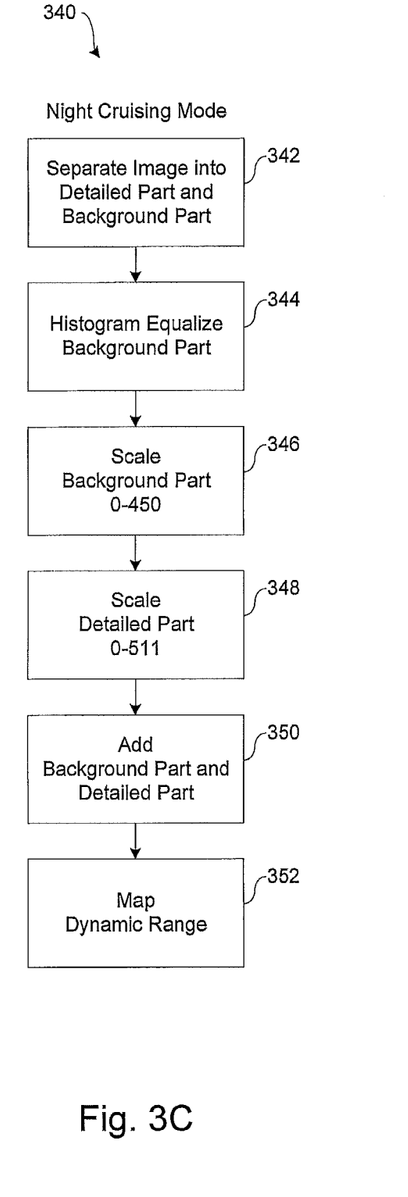

FIG. 3C shows one embodiment of an infrared processing technique 340 as described in reference to block 225 of FIG. 2. In one implementation, the infrared processing technique 340 comprises a night cruising mode of operation for maritime applications. For example, during night cruising, the visible channel has limited use for other than artificially illuminated objects, such as other watercraft. The thermal infrared imager may be used to penetrate the darkness and assist in the identification of buoys, rocks, other watercraft, islands and structures on shore. The thermal infrared imager may also find semi-submerged obstacles that potentially lie directly in the course of the watercraft. In the night cruising mode, the display algorithm may be tuned to find objects in the water without distorting the scene (i.e., field of view) to the extent that it becomes useless for navigation.

In one embodiment, the night cruising mode is intended for low contrast situations encountered on an open ocean. The scene (i.e., field of view) may be filled with a uniform temperature ocean, and any navigational aids or floating debris may sharply contrast with the uniform temperature of the ocean. Therefore, infrared processing technique 340 for the night cruising mode is useful for situational awareness in, for example, open ocean.

Referring to FIG. 3C, the image is separated into a background image part and a detailed image part (block 342). Next, the background image part is histogram equalized (block 344) and scaled (e.g., 0-450) (block 346). Next, the detailed image part is scaled (e.g., 0-511) (block 348). Next, the histogram-equalized background image part and the scaled detailed image part are added together to form an output image (block 350). Next, the dynamic range of the output image is linearly mapped to fit the display component 140 (block 352). It should be appreciated that the block order in which the process 340 is executed may be executed in an different order without departing from the scope of the present disclosure.

In various implementations, during processing of an image when the night cruising mode is selected, the input image is split into detailed and background image components using a non-linear edge preserving low pass filter (LPF), such as a median filter or by anisotropic diffusion. The background image component comprises a low pass component, and the detailed image part is extracted by subtracting the background image part from the input image. To enhance the contrast of small and potentially weak objects, the detailed and background image components may be scaled so that the details are given approximately 60% of the output/display dynamic range. In one enhancement of the night cruising mode, objects in the water are tracked, and if they are on direct collision course as the current watercraft course, they are marked in the image, and an audible alarm may be sounded. For systems with both visible and thermal imager, the thermal imager may be displayed by default.

In one embodiment, a first part of the image signal may include a background image part comprising a low spatial frequency high amplitude portion of an image. In one example, a low pass filter (e.g., low pass filter algorithm) may be utilized to isolate the low spatial frequency high amplitude portion of the image signal (e.g., infrared image signal). In another embodiment, a second part of the image signal may include a detailed image part comprising a high spatial frequency low amplitude portion of an image. In one example, a high pass filter (e.g., high pass filter algorithm) may be utilized to isolate the high spatial frequency low amplitude portion of the image signal (e.g., infrared image signal). Alternately, the second part may be derived from the image signal and the first part of the image signal, such as by subtracting the first part from the image signal.

In general for example, the two image parts (e.g., first and second parts) of the image signal may be separately scaled before merging the two image parts to produce an output image. For example, the first or second parts may be scaled or both the first and second parts may be scaled. In one aspect, this may allow the system to output an image where fine details are visible and tunable even in a high dynamic range scene. In some instances, as an example, if an image appears less useful or degraded by some degree due to noise, then one of the parts of the image, such as the detailed part, may be suppressed rather than amplified to suppress the noise in the merged image to improve image quality.

Figure 3D:
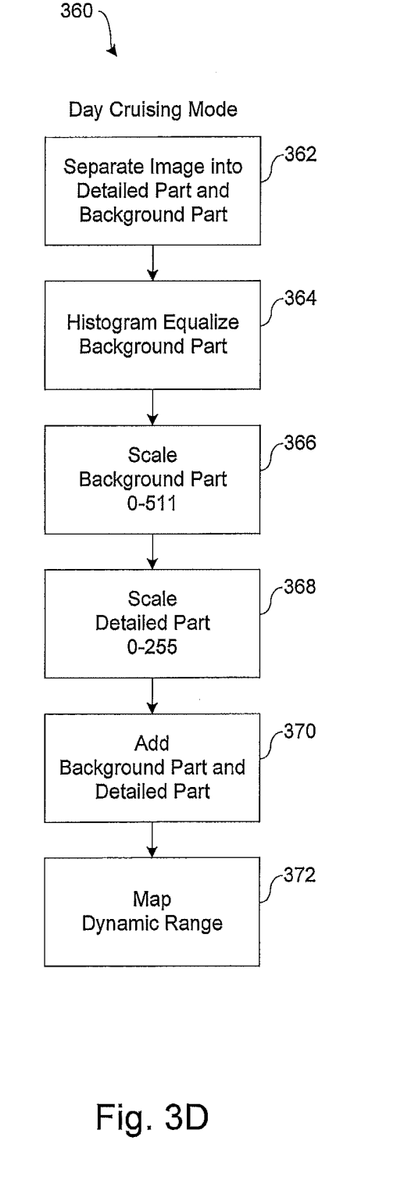

FIG. 3D shows one embodiment of an infrared processing technique 360 as described in reference to block 225 of FIG. 2. In one implementation, the infrared processing technique 360 comprises a day cruising mode of operation for maritime applications. For example, during day cruising, the user or operator may rely on human vision for orientation immediately around the watercraft. Image capturing system 100 may be used to zoom in on objects of interest, which may involve reading the names of other watercraft, and searching for buoys, structures on land, etc.

Referring to FIG. 3D, the image is separated into a background image part and a detailed image part (block 362). Next, the background image part is histogram equalized (block 364) and scaled (e.g., 0-511) (block 366). Next, the detailed image part is scaled 0-255 (block 368). Next, the histogram-equalized background image part and the scaled detailed image part are added together to form an output image (block 370). Next, the dynamic range of the output image is linearly mapped to fit the display component 140 (block 372). It should be appreciated that the block order in which the process 360 is executed may be executed in an different order without departing from the scope of the present disclosure.

In one embodiment, the day cruising mode is intended for higher contrast situations, such as when solar heating leads to greater temperature differences between unsubmerged or partially submerged objects and the ocean temperature. Hence, infrared processing technique 360 for the day cruising mode is useful for situational awareness in, for example, high contrast situations in maritime applications.

In various implementations, during processing of an image when the day cruising mode is selected, the input image is split into its detailed and background components respectively using a non-linear edge preserving low pass filter, such as a median filter or by anisotropic diffusion. For color images, this operation may be achieved on the intensity part of the image (e.g., Y in a YCrCb format). The background image part comprises the low pass component, and the detailed image part may be extracted by subtracting the background image part from the input image. To enhance the contrast of small and potentially weak objects, the detailed and background image parts may be scaled so that the details are given approximately 35% of the output/display dynamic range. For systems with both visible and thermal imagers the visible image may be displayed by default.

Figure 3E:
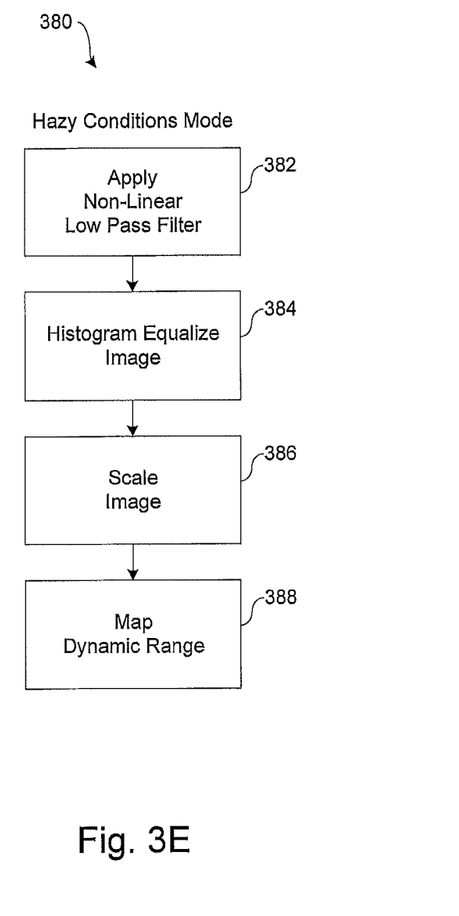

FIG. 3E shows one embodiment of an infrared processing technique 380 as described in reference to block 225 of FIG. 2. In one implementation, the infrared processing technique 380 comprises a hazy conditions mode of operation for maritime applications. For example, even during daytime operation, a user or operator may achieve better performance from an imager using an infrared (MWIR, LWIR) or near infrared (NIR) wave band. Depending on vapor content and particle size, a thermal infrared imager may significantly improve visibility under hazy conditions. If neither the visible nor the thermal imagers penetrate the haze, image capturing system 100 may be set in hazy conditions mode under which system 100 attempts to extract what little information is available from the chosen infrared sensor. Under hazy conditions, there may be little high spatial frequency information (e.g., mainly due, in one aspect, to scattering by particles). The information in the image may be obtained from the low frequency part of the image, and boosting the higher frequencies may drown the image in noise (e.g., temporal and/or fixed pattern).

Referring to FIG. 3E, a non-linear edge preserving low pass filter (LPF) is applied to the image (block 382). Next, the image is histogram equalized (block 384) and scaled (block 386) to form a histogram equalized output image. Next, the dynamic range of the output image is linearly mapped to fit the display component 140 (block 388). It should be appreciated that the block order in which the process 380 is executed may be executed in an different order without departing from the scope of the present disclosure.

In various implementations, during processing of an image when the hazy conditions mode is selected, a non-linear, edge preserving, low pass filter, such as median or by anisotropic diffusion is applied to the image (i.e., either from the thermal imager or the intensity component of the visible color image). In one aspect, the output from the low pass filter operation may be histogram equalized and scaled to map the dynamic range to the display and to maximize contrast of the display.

Figure 3F:
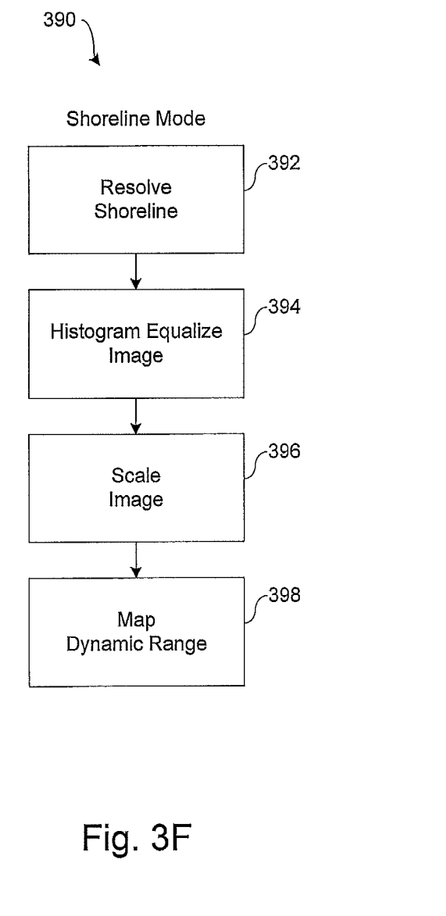

FIG. 3F shows one embodiment of an infrared processing technique 390 as described in reference to block 225 of FIG. 2. In one implementation, the infrared processing technique 390 comprises a shoreline mode of operation for maritime applications.

Referring to FIG. 3F, the shoreline may be resolved (block 392). For example as discussed previously, shoreline identification (e.g., horizon and/or shoreline) may be determined by applying an image processing transform (e.g., a Hough transform) to the image (block 392), which may be used to position the infrared camera's field of view and/or to provide a line (e.g., any type of marker, such as a red line(s) or other indicia on the displayed image. Next, the image is histogram equalized (block 394) and scaled (block 396) to form an output image. Next, the dynamic range of the output image is linearly mapped to fit the display component 140 (block 398). It should be appreciated that the block order in which the process 390 is executed may be executed in a different order without departing from the scope of the present disclosure.

In one implementation, the information produced by the transform (e.g., Hough transform) may be used to identify the shoreline or even the horizon as a linear region for display. The transform may be applied to the image in a path separate from the main video path (e.g., the transform when applied does not alter the image data and does not affect the later image processing operations), and the application of the transform may be used to detect linear regions, such as straight lines (e.g., of the shoreline and/or horizon). In one aspect, by assuming the shoreline and/or horizon comprises a straight line stretching the entire width of the frame, the shoreline and/or horizon may be identified as a peak in the transform and may be used to maintain the field of view in a position with reference to the shoreline and/or horizon. As such, the input image (e.g., preprocessed image) may be histogram equalized (block 394) and scaled (block 396) to generate an output image, and then the transform information (block 392) may be added to the output image to highlight the shoreline and/or horizon of the displayed image.

Moreover, in the shoreline mode of operation, the image may be dominated by sea (i.e., lower part of image) and sky (i.e., upper part of image), which may appear as two peaks in the image histogram. In one aspect, significant contrast is desired over the narrow band of shoreline, and a low number (e.g., relatively based on the number of sensor pixels and the number of bins used in the histogram) may be selected for the plateau limit for the histogram equalization. In one aspect, for example, a low plateau limit (relative) may reduce the effect of peaks in the histogram and give less contrast to sea and sky while preserving contrast for the shoreline and/or horizon regions.

FIG. 4 shows a block diagram illustrating a method 400 of implementing modes 410A-410E and infrared processing techniques related thereto, as described in reference to various embodiments of the present disclosure. In particular, a first mode refers to night docking mode 410A, a second mode refers to man overboard mode 410B, a third mode refers to night cruising mode 410C, a fourth mode refers to day cruising mode 410D, and a fifth mode refers to hazy conditions mode 410E.

In one implementation, referring to FIG. 4, processing component 110 of image capturing system 100 of FIG. 1 may perform method 400 as follows. Sensor data (i.e., infrared image data) of a captured image is received or obtained (block 402). Correction terms are applied to the received sensor data (block 404), and temporal noise reduction is applied to the received sensor data (block 406).

Next, at least one of the selected modes 410A-410E may be selected by a user or operator via control component 150 of image capturing system 100, and processing component 110 executes the corresponding processing technique associated with the selected mode of operation. In one example, if night docking mode 410A is selected, then the sensor data may be histogram equalized and scaled (e.g., 0-511) (block 420), the sensor data may be linearly scaled (e.g., 0-128) saturating the highest and lowest (e.g., 1%) (block 422), and the histogram equalized sensor data is added to the linearly scaled sensor data for linearly mapping the dynamic range to display component 140 (block 424). In another example, if man overboard mode 410B is selected, then infrared capturing component 130 of image capturing system 100 may be moved or positioned so that the horizon is at an upper part of the field of view (FoV), a high pass filter (HPF) is applied to the sensor data (block 432), and the dynamic range of the high pass filtered sensor data is then linearly mapped to fit display component 140 (block 434). In another example, if night cruising mode 410C is selected, the sensor data is processed to extract a faint detailed part and a background part with a high pass filter (block 440), the background part is histogram equalized and scaled (e.g., 0-450) (block 442), the detailed part is scaled (e.g., 0-511) (block 444), and the background part is added to the detailed part for linearly mapping the dynamic range to display component 140 (block 446). In another example, if day cruising mode 410D is selected, the sensor data is processed to extract a faint detailed part and a background part with a high pass filter (block 450), the background part is histogram equalized and scaled (e.g., 0-511) (block 452), the detailed part is scaled 0-255 (block 454), and the background part is added to the detailed part for linearly mapping the dynamic range to display component 140 (block 456). In still another example, if hazy condition mode 410E is selected, then a non-linear low pass filter (e.g., median) is applied to the sensor data (block 460), which is then histogram equalized and scaled for linearly mapping the dynamic range to display component 140 (block 462).

For any of the modes (e.g., blocks 410A-410E), the image data for display may be marked (e.g., color coded, highlighted, or otherwise identified with indicia) to identify, for example, a suspected person in the water (e.g., for man overboard) or a hazard in the water (e.g., for night time cruising, day time cruising, or any of the other modes). For example, as discussed herein, image processing algorithms may be applied (block 470) to the image data to identify various features (e.g., objects, such as a warm-bodied person, water hazard, horizon, or shoreline) in the image data and appropriately mark these features to assist in recognition and identification by a user viewing the display. As a specific example, a suspected person in the water may be colored blue, while a water hazard (e.g., floating debris) may be colored yellow in the displayed image.

Furthermore for any of the modes (e.g., blocks 410A-410E), the image data for display may be marked to identify, for example, the shoreline (e.g., shoreline and/or horizon). For example, as discussed herein, image processing algorithms may be applied (block 475) to the image data to identify the shoreline and/or horizon and appropriately mark these features to assist in recognition and identification by a user viewing the display. As a specific example, the horizon and/or shoreline may be outlined or identified with red lines on the displayed image to aid the user viewing the displayed image.

Next, after applying at least one of the infrared processing techniques for modes 410A-410E, a determination is made as to whether to display the processed sensor data in night mode (i.e., apply the night color palette) (block 480), in a manner as previously described. If yes, then the night color palette is applied to the processed sensor data (block 482), and the processed sensor data is displayed in night mode (block 484). If no, then the processed sensor data is displayed in a non-night mode manner (e.g., black hot or white hot palette) (block 484). It should be appreciated that, in night mode, sensor data (i.e., image data) may be displayed in a red or green color palette to improve night vision capacity for a user or operator.

FIG. 5 shows a block diagram illustrating one embodiment of control component 150 of infrared imaging system 100 for selecting between different modes of operation, as previously described in reference to FIGS. 2-4. In one embodiment, control component 150 of infrared imaging system 100 may comprise a user input and/or interface device, such as control panel unit 500 (e.g., a wired or wireless handheld control unit) having one or more push buttons 510, 520, 530, 540, 550, 560, 570 adapted to interface with a user and receive user input control values and further adapted to generate and transmit one or more input control signals to processing component 100. In various other embodiments, control panel unit 500 may comprise a slide bar, rotatable knob to select the desired mode, keyboard, etc., without departing from the scope of the present disclosure.

In various implementations, a plurality of push buttons 510, 520, 530, 540, 550, 560, 570 of control panel unit 500 may be utilized to select between various modes of operation as previously described in reference to FIGS. 2-4. In various implementations, processing component 110 may be adapted to sense control input signals from control panel unit 500 and respond to any sensed control input signals received from push buttons 510, 520, 530, 540, 550, 560, 570. Processing component 110 may be further adapted to interpret the control input signals as values. In various other implementations, it should be appreciated that control panel unit 500 may be adapted to include one or more other push buttons (not shown) to provide various other control functions of infrared imaging system 100, such as auto-focus, menu enable and selection, field of view (FoV), brightness, contrast, and/or various other features. In another embodiment, control panel unit 500 may comprise a single push button, which may be used to select each of the modes of operation 510, 520, 530, 540, 550, 560, 570.

In another embodiment, control panel unit 500 may be adapted to be integrated as part of display component 140 to function as both a user input device and a display device, such as, for example, a user activated touch screen device adapted to receive input signals from a user touching different parts of the display screen. As such, the GUI interface device may have one or more images of, for example, push buttons 510, 520, 530, 540, 550, 560, 570 adapted to interface with a user and receive user input control values via the touch screen of display component 140.

In one embodiment, referring to FIG. 5, a first push button 510 may be enabled to select the night docking mode of operation, a second push button 520 may be enabled to select the man overboard mode of operation, a third push button 530 may be enabled to select the night cruising mode of operation, a fourth push button 540 may be enabled to select the day cruising mode of operation, a fifth push button 550 may be enabled to select the hazy conditions mode of operation, a sixth push button 560 may be enabled to select the shoreline mode of operation, and a seventh push button 570 may be enabled to select or turn the night display mode (i.e., night color palette) off. In another embodiment, a single push button for control panel unit 500 may be used to toggle t each of the modes of operation 510, 520, 530, 540, 550, 560, 570 without departing from the scope of the present disclosure.

Where applicable, various embodiments of the invention may be implemented using hardware, software, or various combinations of hardware and software. Where applicable, various hardware components and/or software components set forth herein may be combined into composite components comprising software, hardware, and/or both without departing from the scope and functionality of the present disclosure. Where applicable, various hardware components and/or software components set forth herein may be separated into sub-components having software, hardware, and/or both without departing from the scope and functionality of the present disclosure. Where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, ordering of various steps described herein may be changed, combined into composite steps, and/or separated into sub-steps to provide features described herein.

In various embodiments, software for mode modules 112A-112N may be embedded (i.e., hard-coded) in processing component 110 or stored on memory component 120 for access and execution by processing component 110. As previously described, the code (i.e., software and/or hardware) for mode modules 112A-112N define, in one embodiment, preset display functions that allow processing component 100 to switch between the one or more processing techniques, as described in reference to FIGS. 2-4, for displaying captured and/or processed infrared images on display component 140.

Embodiments described above illustrate but do not limit the disclosure. It should also be understood that numerous modifications and variations are possible in accordance with the principles of the present disclosure. Accordingly, the scope of the disclosure is defined only by the following claims.

What is claimed is:

1. An infrared camera system comprising:
   an infrared image sensor configured to capture an infrared image;
   a controller configured to receive a user input corresponding to a user selected infrared image processing mode selected from a plurality of selectable infrared image processing modes, and generate a control signal indicative of the user selected processing mode, wherein the plurality of selectable infrared image processing modes includes a maritime night cruising mode, a maritime day cruising mode, and a maritime man overboard mode; and
   an image processor configured to receive the generated control signal from the controller and process the captured infrared image by using histogram equalization and/or specific filtering techniques according to the user selected infrared image processing mode responsive to the generated control signal to generate a processed infrared image.

2. The system of claim 1, wherein the plurality of selectable infrared image processing modes includes a maritime night docking mode that causes the image processor to histogram equalize and scale the captured infrared image to generate the processed infrared image.

3. The system of claim 1, wherein the maritime man overboard mode causes the processing component to apply a high pass filter to the captured infrared image to generate the processed infrared image.

4. The system of claim 1, wherein the maritime night cruising mode causes the processing component to extract a detailed part and a background part from the captured infrared image, separately scale the detailed part, separately histogram equalize and scale the background part, and add the detailed part to the background part to generate the processed infrared image.

5. The system of claim 1, wherein the maritime day cruising mode causes the processing component to extract a detailed part and a background part from the captured infrared image, separately scale the detailed part, separately histogram equalize and scale the background part, and add the detailed part to the background part to generate the processed infrared image.

6. The system of claim 1, wherein the plurality of selectable infrared image processing modes includes a maritime hazy conditions mode that causes the processing component to apply a non-linear low pass filter on the captured infrared image, and then histogram equalize and scale the filtered image to generate the processed infrared image.

7. The system of claim 1, wherein the plurality of selectable infrared image processing modes includes a maritime shoreline mode that causes the processing component to apply a Huff or Hough transform operation to the captured infrared image to generate the processed infrared image.

8. The system of claim 1, wherein the display component is configured to display the processed infrared image in a black hot palette or white hot palette, and wherein the system further comprises a display configured to display the processed infrared image.

9. The system of claim 1, further comprising a night display mode, wherein the display component is configured to display the processed infrared image in a red color palette or a green color palette.

10. The system of claim 1, further comprising a memory component configured to store at least one of the captured infrared image and the processed infrared image, and wherein the plurality of selectable infrared image processing modes includes a maritime night docking mode, the maritime man overboard mode, the maritime night cruising mode, the maritime day cruising mode, a maritime hazy conditions mode, and a maritime shoreline mode.

11. The system of claim 1, further comprising a sensing component configured to provide environmental information to the processing component.

12. A method for processing an infrared image, the method comprising:
   capturing the infrared image;
   receiving a user input corresponding to a user selected infrared image processing mode selected from a plurality of selected infrared image processing modes, wherein the plurality of selectable infrared image processing modes includes a maritime docking mode, a maritime man overboard mode, and a maritime night cruising mode;
   processing the captured infrared image according to the user selected infrared image processing mode by using an image processing operation, which uses histogram equalization and/or specific filtering techniques, that is specific to the user selected infrared image processing mode to generate a processed image; and
   displaying the processed infrared image.

13. The method of claim 12, wherein processing the captured infrared image according to the maritime night docking mode includes histogram equalizing and scaling the captured infrared image to generate the processed infrared image.

14. The method of claim 12, wherein processing the captured infrared image according to the maritime man overboard mode includes applying a high pass filter to the captured infrared image to generate the processed infrared image.

15. The method of claim 12, wherein processing the captured infrared image according to the maritime night cruising mode includes extracting a detailed part and a background part from the captured infrared image, separately scaling the detailed part, separately histogram equalizing and scaling the background part, and adding the detailed part to the background part to generate the processed infrared image.

16. The method of claim 12, wherein the plurality of selectable infrared image processing modes includes a maritime day cruising mode, and wherein processing the captured infrared image according to the maritime day cruising mode includes extracting a detailed part and a background part from the captured infrared image, separately scaling the detailed part, separately histogram equalizing and scaling the background part, and adding the detailed part to the background part to generate the processed infrared image.

17. The method of claim 12, wherein the plurality of selectable infrared image processing modes includes a maritime hazy conditions mode, and wherein processing the captured infrared image includes applying a non-linear low pass filter on the captured infrared image, and then histogram equalizing and scaling the filtered image to generate the processed infrared image.

18. The method of claim 12, wherein the plurality of selectable infrared image processing modes includes a shoreline mode, and wherein processing the captured infrared image according to the shoreline mode includes applying at least a Huff or Hough transform operation on the captured infrared image to generate the processed infrared image.

19. The method of claim 12, wherein the processed infrared image is displayed in a black hot palette, a white hot palette, or a red color palette.

20. A non-transitory computer-readable medium on which is stored instructions for execution by a processor for performing a method, the instructions comprising instructions for:
   capturing an infrared image;
   receiving a user input corresponding to a user selected infrared image processing mode, wherein the plurality of selectable processing modes includes a maritime night docking mode, a maritime night cruising mode, and a maritime day cruising mode; and
   processing the captured infrared image according to the user selected infrared image processing mode by using an image processing operation, which uses histogram equalization and/or specific filtering techniques, that is specific to the user selected infrared image processing mode to generate a processed infrared image.

21. The non-transitory computer-readable medium of claim 20, wherein the plurality of selectable infrared image processing modes includes the maritime night docking mode, and wherein processing the captured infrared image includes histogram equalizing and scaling the captured infrared image to generate the processed infrared image, and wherein the instructions further comprise displaying the processed infrared image.

22. The non-transitory computer-readable medium of claim 20, wherein the plurality of selectable infrared image processing modes includes a maritime man overboard mode, and wherein processing the captured infrared image includes applying a high pass filter to the captured infrared image to generate the processed infrared image; and wherein the plurality of selectable processing modes includes the maritime night docking mode, the maritime man overboard mode, the maritime night cruising mode, the maritime day cruising mode, a maritime hazy conditions mode, and a maritime shoreline mode.

23. The non-transitory computer-readable medium of claim 20, wherein the plurality of selectable infrared image processing modes includes the maritime night cruising mode, and wherein processing the captured infrared image includes extracting a detailed part and a background part from the captured infrared image, separately scaling the detailed part, separately histogram equalizing and scaling the background part, and adding the detailed part to the background part to generate the processed infrared image.

24. The non-transitory computer-readable medium of claim 20, wherein the plurality of selectable infrared image processing modes includes the maritime day cruising mode, and wherein processing the captured infrared image includes extracting a detailed part and a background part from the captured infrared image, separately scaling the detailed part, separately histogram equalizing and scaling the background part, and adding the detailed part to the background part to generate the processed infrared image.

25. The non-transitory computer-readable medium of claim 20, wherein the plurality of selectable infrared image processing modes includes a maritime hazy conditions mode, and wherein processing the captured infrared image includes applying a non-linear low pass filter on the captured infrared image, and then histogram equalizing and scaling the filtered image to generate the processed infrared image.

26. The method of claim 12, wherein the user selected infrared image processing mode comprises the maritime man overboard mode and wherein the method further comprises moving an infrared capturing component so that a horizon is at an upper part of a field of view of the infrared capturing component.

* * * * *